(12) United States Patent
Galvan et al.

(10) Patent No.: US 10,501,616 B2
(45) Date of Patent: Dec. 10, 2019

(54) PROPYLENE-BASED COMPOSITION FOR PIPES

(71) Applicant: BASELL POLIOLEFINE ITALIA S.R.L., Milan (IT)

(72) Inventors: Monica Galvan, Ferrara (IT); Claudio Cavalieri, Ferrara (IT); Francesca Tisi, Ferrara (IT); Giampaolo Pellegatti, Ferrara (IT); Thomas Boehm, Darmstadt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/338,904

(22) PCT Filed: Sep. 22, 2017

(86) PCT No.: PCT/EP2017/074120
§ 371 (c)(1),
(2) Date: Apr. 2, 2019

(87) PCT Pub. No.: WO2018/065242
PCT Pub. Date: Apr. 12, 2018

(65) Prior Publication Data
US 2019/0338113 A1   Nov. 7, 2019

(30) Foreign Application Priority Data
Oct. 6, 2016   (EP) .................... 16192533

(51) Int. Cl.
*C08L 23/04* (2006.01)
*C08L 23/20* (2006.01)
*C08L 23/10* (2006.01)

(52) U.S. Cl.
CPC ............... *C08L 23/20* (2013.01); *C08L 23/04* (2013.01); *C08L 23/10* (2013.01); *C08L 2203/18* (2013.01); *C08L 2205/025* (2013.01); *C08L 2314/02* (2013.01)

(58) Field of Classification Search
CPC .......... C08L 23/20; C08L 23/04; C08L 23/10; C08L 2203/18; C08L 2205/025; C08L 2314/02
See application file for complete search history.

(56) References Cited

U.S. PATENT DOCUMENTS 3,882,197 A * 5/1975 Fritz et al. .............. C08L 23/10
                                                    525/240
8,993,678 B2    3/2015 Galvan et al.
2018/0362748 A1* 12/2018 Covezzi et al. ........ B32B 27/08

FOREIGN PATENT DOCUMENTS

| RU | 2567750 C2 | 11/2015 |
| WO | 2008/077773 A1 | 7/2008 |
| WO | 2011/160953 A1 | 12/2011 |
| WO | 2013/083617 A1 | 6/2013 |

OTHER PUBLICATIONS

International Search Report and Written Opinion dated Dec. 15, 2017 (Dec. 15, 2017) for Corresponding PCT/EP2017/074120.

* cited by examiner

*Primary Examiner* — Nathan M Nutter

(57) ABSTRACT

A polyolefin composition made from or containing:
A) from 85.0 wt % to 99.5 wt % of a propylene 1-hexene copolymer, based upon the weight of the polyolefin composition and
B) from 0.5 wt % to 15.0 wt % of a propylene, ethylene copolymer composition, based upon the weight of the polyolefin composition, made from or containing:
b1) from 12 wt % to 52 wt % of a propylene homopolymer or a propylene/ethylene copolymer, based upon the weight of the propylene, ethylene copolymer composition and
b2) from 48 wt % to 88 wt % of a propylene ethylene copolymer, based upon the weight of the propylene, ethylene copolymer composition, having a content of ethylene derived units ranging from 15.0 wt % to 42.0 wt %;
wherein the polyolefin composition has a melt flow rate (230° C./5 kg. ISO 1133) ranging from 0.2 g/10 min to 4.0 g/10 min; the sum A+B being 100 and the sum b1+b2 being 100.

10 Claims, No Drawings

PROPYLENE-BASED COMPOSITION FOR PIPES

FIELD OF THE INVENTION

In general, the present disclosure relates to the field of chemistry. More specifically, the present disclosure relates to polymer chemistry. In particular, the present disclosure relates to a composition made from or containing a propylene/1-hexene copolymer and a heterophasic propylene ethylene copolymer.

BACKGROUND OF THE INVENTION

Some compositions made from or containing a propylene ethylene 1-hexene terpolymers and a heterophasic copolymer can be useful for small diameter pipes, where impact properties at low temperatures are a consideration.

SUMMARY OF THE INVENTION

The present disclosure provides a polyolefin composition made from or containing:
A) from 85.0 wt % to 99.5 wt % of a propylene 1-hexene copolymer, based upon the weight of the polyolefin composition, wherein:
  i) the content of 1-hexene derived units ranges from 0.6 wt % to 6.0 wt %, based upon the weight of the propylene 1-hexene copolymer;
  ii) the melt flow rate (MFR) (ISO 1133 230° C., 5 kg) ranges from 0.6 to 5.0 g/10 min; and
  iii) the xylene soluble content measured at 25° C. is lower than 10 wt %, based upon the weight of the propylene 1-hexene copolymer; alternatively lower than 8 wt %; alternatively lower than 5 wt %; and
B) from 0.5 wt % to 15.0 wt % of a propylene, ethylene copolymer composition, based upon the weight of the polyolefin composition, made from or containing:
  b1) from 12 wt % to 52 wt %, based upon the weight of the propylene, ethylene copolymer composition, of a propylene homopolymer or a propylene/ethylene copolymer having a content of ethylene derived units ranging from 0.1 wt % to 4.5 wt %, based upon the weight of the propylene/ethylene copolymer; and having a xylene soluble content measured at 25° C. lower than 10 wt %, based upon the weight of the propylene homopolymer or the propylene/ethylene copolymer;
  b2) from 48 wt % to 88 wt %, based upon the weight of the propylene, ethylene copolymer composition, of a propylene ethylene copolymer having a content of ethylene derived units ranging from 15 wt % to 42 wt %, based upon the weight of the propylene ethylene copolymer;
wherein the polyolefin composition has a melt flow rate (230° C./5 kg. ISO 1133) ranging from 0.2 g/10 min to 4.0 g/10 min;
the sum of the amount of components A+B being 100 and the sum of the amount of components b1+b2 being 100.

DETAILED DESCRIPTION OF THE INVENTION

The present disclosure provides a polyolefin composition made from or containing:
A) from 85.0 wt % to 99.5 wt %, based upon the weight of the polyolefin composition; alternatively 90.0 wt % to 99.5 wt %; alternatively from 99.5 wt % to 93.0 wt %; alternatively from 96.5 wt % to 94.0 wt %, of a propylene 1-hexene copolymer wherein:
  i) the content of 1-hexene derived units ranges from 0.6 wt % to 6.0 wt %, based upon the weight of the propylene 1-hexene copolymer;
  ii) the melt flow rate (MFR) (ISO 1133 230° C., 5 kg) ranges from 0.6 to 5.0 g/10 min;
    alternatively from 0.9 to 2.5 g/10 min;
  iii) the xylene soluble content measured at 25° C. lower than 10 wt %, based upon the weight of the propylene 1-hexene copolymer; alternatively lower than 8 wt %; alternatively lower than 5 wt %; and
B) from 0.5 wt % to 15.0 wt %, based upon the weight of the polyolefin composition; alternatively from 0.5 wt % to 10.0 wt %; alternatively from 0.5 wt % to 7.0 wt %; alternatively from 3.5 wt % to 6.0 wt % of a propylene, ethylene copolymer composition made from or containing:
  b1) from 12 wt % to 52 wt %, based upon the weight of the propylene, ethylene copolymer composition; alternatively from 15 wt % to 43 wt %; alternatively from 20 wt % to 33 wt % of a propylene homopolymer or a propylene/ethylene copolymer having a content of ethylene derived units ranging from 0.1 wt % to 4.5 wt %, based upon the weight of the propylene/ethylene copolymer; and having a xylene soluble content measured at 25° C. lower than 10 wt %, based upon the weight of the propylene homopolymer or the propylene/ethylene copolymer; alternatively lower than 8 wt %; alternatively lower than 7 wt %;
  b2) from 48 wt % to 88 wt %, based upon the weight of the propylene, ethylene copolymer composition; alternatively from 57 wt % to 85 wt %; alternatively from 67 wt % to 80 wt % of a propylene ethylene copolymer having a content of ethylene derived units ranging from 15 wt % to 42 wt %, based upon the weight of the propylene ethylene copolymer;
wherein the polyolefin composition has a melt flow rate (230° C./5 kg. ISO 1133) ranging from 0.2 g/10 min to 4.0 g/10 min; alternatively from 0.4 g/10 min to 3.0 g/10 min; alternatively from 0.5 g/10 min to 2 g/10 min; the sum A+B being 100 and the sum b1+b2 being 100.

In some embodiments, the component A) is endowed with one or more of these features:
(i) the content of 1-hexene derived units ranges from 1.0 wt % to 4.5 wt %, based upon the weight of the propylene 1-hexene copolymer; alternatively from 1.1 wt % to 4.1 wt %; alternatively from 2.5 wt % to 3.9 wt %; alternatively from 2.8 wt % to 3.7 wt %;
(ii) the melting temperature (DSC) ranging from 155° C. to 130° C.; alternatively from 150° C. to 136° C.
(iii) a polydispersity index (PI) ranging from 2.0 to 7.0, alternatively from 3.0 to 6.5, alternatively from 3.5 to 6.0.

In some embodiments, component b1) is a propylene ethylene copolymer having an content of ethylene derived units ranging from 1.1 wt % to 4.2 wt %, based upon the weight of the propylene ethylene copolymer; alternatively from 2.3 wt % to 3.9 wt %. In some embodiments, component b1) is a propylene homopolymer.

In some embodiments, component b2) is a propylene ethylene copolymer having an content of ethylene derived units ranging from 18 wt % to 38 wt %, based upon the weight of the propylene ethylene copolymer; alternatively from 21 wt % to 34 wt %, alternatively from 23 wt % to 31 wt %; and having an intrinsic viscosity of the xylene soluble fraction at 25° C. ranging from 2.0 dl/g to 5.0 dl/g; alternatively from 2.5 dl/g to 4.5 dl/g.

As used herein, the term "copolymer" refers to a polymer containing only two type of monomers such as propylene/ethylene or propylene/1-hexene.

In some embodiments, the composition of the present disclosure is used to prepare pipes. In some embodiments, the pipes are useful under pressure and at high temperatures.

In some embodiments, the pipe is made from or contains the composition of the present disclosure.

As used herein, the term "pipe also includes pipe fittings, valves and other parts useful in a hot water piping system. As used herein, the term "pipe" also include single and multilayer pipes. In some embodiments, one or more of the layers is a metal layer In some embodiments, the pipe includes an adhesive layer.

In some embodiments, the pipe is made by molding or extrusion.

In some embodiments, the composition of the present disclosure is further made from or to contain an inorganic filler agent in an amount ranging from 0.5 to 60 parts by weight with respect to 100 parts by weight of the composition. In some embodiments, the filler agents are selected from the group consisting of calcium carbonate, barium sulphate, titanium bioxide and talc. In some embodiments, the filler agents are selected from the group consisting of talc and calcium carbonate. In some embodiments, the filler agents have a nucleating effect. In some embodiments, the amount of a nucleating agent is from 0.2 to 5 wt % with respect to the polymer amount.

In some embodiments, the composition of the disclosure is used for preparing pipes with walls having a configuration other than a smooth inner surface or a smooth outer surface. In some embodiments, the pipes have a sandwich-like pipe wall, alternatively a hollow wall construction with longitudinally extending cavities, alternatively a hollow wall construction with spiral cavities, alternatively a smooth inner surface and a compact or hollow, spirally shaped, or an annularly ribbed outer surface, independently of the configuration of the pipe ends.

In some embodiments, the articles are made with single or twin screw extruders.

In some embodiments, the composition of the present disclosure is prepared by blending the various components A), b1) and b2) or by preparing component A) and then blending component A) with component B), where component B) was prepared in a single polymerization process by sequential polymerization steps.

In some embodiments, the polymerization of component A) and component B) is carried out in the presence of Ziegler-Natta catalysts. The Zeigler-Natta catalysts have a solid catalyst component made from or containing a titanium compound having at least one titanium-halogen bond, and an electron-donor compound, both supported on a magnesium halide in active form. The Zeigler-Natta catalysts also a co-catalyst, which is an organoaluminum compound. In some embodiments, the organoaluminum compound is an aluminium alkyl compound.

In some embodiments, an external donor is added.

In some embodiments, the catalysts can produce polypropylene with a value of xylene insolubility at ambient temperature greater than 90%, alternatively greater than 95%.

Examples of catalysts are disclosed in U.S. Pat. Nos. 4,399,054, 4,472,524, and European Patent No. 45977.

In some embodiments, the solid catalyst components are made from or contain, as electron-donors (internal donors), compounds selected from the group consisting of ethers, ketones, lactones, compounds containing N, P and/or S atoms, and esters of mono- and dicarboxylic acids.

In some embodiments, the electron-donor compounds are selected from the group consisting of esters of phthalic acid and 1,3-diethers of formula:

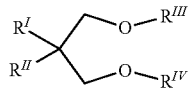

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

In some embodiments, the ethers are described in published European Patent Application Nos. 361493 and 728769.

In some embodiments, the diethers are selected from the group consisting of 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis (methoxymethyl) fluorene.

In some embodiments, the electron-donor compounds are phthalic acid esters. In some embodiments, the phthalic acid esters are selected from the group consisting of diisobutyl, dioctyl, diphenyl and benzylbutyl phthalate.

In some embodiments, a $MgCl_2.nROH$ adduct wherein n is from 1 to 3 and ROH is ethanol, butanol or isobutanol, is reacted with an excess of $TiCl_4$ containing the electron-donor compound. In some embodiments, the adduct is in the form of spheroidal particles. In some embodiments, the reaction temperature is from 80 to 120° C. The solid is then isolated and reacted once more with $TiCl_4$, in the presence or absence of the electron-donor compound, after which the solid is separated and washed with aliquots of a hydrocarbon until the chlorine ions have disappeared.

In some embodiments, the titanium compound, expressed as Ti, is present in an amount from 0.5 to 10% by weight, based upon the weight of the solid catalyst component. In some embodiments, the quantity of electron-donor compound which remains fixed on the solid catalyst component is 5 to 20% by moles with respect to the magnesium dihalide.

In some embodiments, the titanium compounds are the halides and the halogen alcoholates of titanium. In some embodiments, the titanium compound is titanium tetrachloride.

The reactions described above result in the formation of a magnesium halide in active form. In some embodiments, the formation of magnesium halide in active form starts from magnesium compounds other than halides, such as magnesium carboxylates.

In some embodiments, the Al-alkyl compounds used as co-catalysts are made from or contain Al-trialkyls and linear or cyclic Al-alkyl compounds containing two or more Al atoms bonded to each other by way of O or N atoms, or $SO_4$ or $SO_3$ groups. In some embodiments, the Al-trialkyls are selected from the group consisting of Al-triethyl, Al-triisobutyl, Al-tri-n-butyl.

In some embodiments, the Al-alkyl compound is used in such a quantity that the Al/Ti ratio is from 1 to 1000.

In some embodiments, the external, electron-donor compounds include aromatic acid esters and silicon compounds containing at least one Si—OR bond, where R is a hydrocarbon radical. In some embodiments, the aromatic acid ester is an alkyl benzoate.

In some embodiments, the silicon compounds are selected from the group consisting of (tert-butyl)$_2$Si(OCH$_3$)$_2$, (cyclohexyl)(methyl)Si (OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

In some embodiments, a 1,3-diether is used as an internal donor while external donors are omitted.

In some embodiments, components A) and B) are prepared by using catalysts containing a phthalate as internal donor and (cyclopentyl)$_2$SKOCH$_3$)$_2$ as outside donor, or the 1,3-diethers as internal donors.

In some embodiments, component A) is produced with a polymerization process disclosed in European Patent Application No. 1 012 195.

In some embodiments, the process includes feeding the monomers to the polymerization zones in the presence of catalyst under reaction conditions and collecting the polymer product from the polymerization zones. In the process, the growing polymer particles flow upward through one (first) of the polymerisation zones (riser) under fast fluidization conditions, leave the riser and enter another (second) polymerization zone (downcomer) through which the polymer particles flow downward in a densified form under the action of gravity, leave the downcomer and are reintroduced into the riser, thus establishing a circulation of polymer between the riser and the downcomer.

In the downcomer, high values of density of the solid are reached, which approach the bulk density of the polymer. In some embodiments, a positive gain in pressure is obtained along the direction of flow, permitting reintroduction of the polymer into the riser without the help of mechanical aids. In this way, a "loop" circulation is set up, which is defined by the balance of pressures between the two polymerization zones and by the head loss introduced into the system.

In some embodiments, the condition of fast fluidization in the riser is established by feeding a gas mixture made from or containing the relevant monomers to the riser. In some embodiments, the feeding of the gas mixture is effected below the point of reintroduction of the polymer into the riser by the use of gas distributor aids. In some embodiments, the velocity of transport gas into the riser is higher than the transport velocity under the operating conditions. In some embodiments, the velocity of transport gas is from 2 to 15 m/s.

In some embodiments, the polymer and the gaseous mixture leaving the riser are conveyed to a solid/gas separation zone, where the solid and the gas are separated. From the separation zone, the polymer enters the downcomer. The gaseous mixture leaving the separation zone is compressed, cooled and transferred to the riser. In some embodiments, the gaseous mixture is supplemented with the addition of make-up monomers and/or molecular weight regulators. In some embodiments, the transfer is effected by a recycle line for the gaseous mixture.

In some embodiments, the control of the polymer circulating between the two polymerization zones is effected by metering the amount of polymer leaving the downcomer by controlling the flow of solids. In some embodiments, the flow is controlled by mechanical valves.

In some embodiments, the temperature of polymerization is between 50 to 120° C.

In some embodiments, the first stage process is carried out under operating pressures of between 0.5 and 10 MPa, alternatively between 1.5 to 6 MPa.

In some embodiments, one or more inert gases are maintained in the polymerization zones. In some embodiments, the quantities of the inert gases yields a sum of the partial pressure of the inert gases is between 5 and 80% of the total pressure of the gases. In some embodiments, the inert gas is nitrogen or propane.

The various catalysts are fed up to the riser at any point of the riser. In some embodiments, the catalysts are fed at any point of the downcomer. The catalyst can be in any physical state. Catalysts in either solid or liquid state can be used.

The following examples are given to illustrate the present disclosure without limiting purpose.

Examples

Characterization Methods

Melting Temperature and Crystallization Temperature:

Determined by differential scanning calorimetry (DSC). a sample weighing 6±1 mg, was heated to 220±1° C. at a rate of 20° C./min and kept at 220±1° C. for 2 minutes in nitrogen stream and the samples was thereafter cooled at a rate of 20° C./min to 40±2° C., thereby kept at this temperature for 2 min to crystallize the sample. Then, the sample was again fused at a temperature rise rate of 20° C./min up to 220° C.±1. The melting scan was recorded. A thermogram was obtained. Melting temperatures and crystallization temperatures were determined.

Melt Flow Rate:

Determined according to the method ISO 1133 (230° C., 5 kg).

Solubility in Xylene:

Determined as follows.

2.5 g of polymer and 250 ml of xylene were introduced into a glass flask equipped with a refrigerator and a magnetic stirrer. The temperature was raised in 30 minutes up to the boiling point of the solvent. The solution was then kept under reflux and stirring for further 30 minutes. The closed flask was kept for 30 minutes in a bath of ice and water. The closed flask was then kept in thermostatic water bath at 25° C. for 30 minutes. A solid was formed. The solid was filtered on quick filtering paper. 100 ml of the filtered liquid was poured in a pre-weighted aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

Determination of 1-Hexene Content by NMR $^{13}$C NMR spectra were acquired on an AV-600 spectrometer operating at 150.91 MHz in the Fourier transform mode at 120° C. The peak of the propylene CH was used as an internal reference at 28.83. The $^{13}$C NMR spectrum was acquired using the following parameters:

| Spectral width (SW) | 60 ppm |
| --- | --- |
| Spectrum centre (O1) | 30 ppm |
| Decoupling sequence | WALTZ 65_64p1 |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene as molar percent was calculated from diad using the following relations:

$[P]=PP+0.5PH$ $[H]=HH+0.5PH$

Assignments of the $^{13}$C NMR spectrum of propylene/1-hexene copolymers have been calculated according to the following table:

| Area | Chemical Shift | Assignments | Sequence |
| --- | --- | --- | --- |
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Ethylene (C2) Content
$^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$PPP=100T_{\beta\beta}/S \quad PPE=100T_{\beta\delta}/S \quad EPE=100T_{\delta\delta}/S$ $PEP=100S_{\beta\beta}/S \quad PEE=100S_{\beta\delta}/S \quad EEE=100(0.25S_{\gamma\delta}+0.5S_{\delta\delta})/S$ $S=T_{\beta\beta}+T_{\beta\delta}+T_{\delta\delta}+S_{\beta\beta}+S_{\beta\delta}+0.25S_{\gamma\delta}+0.5S_{\delta\delta}$ The molar percentage of ethylene content was evaluated using the following equation:

$E \% \text{ mol} = 100*[PEP+PEE+EEE]$

The weight percentage of ethylene content was evaluated using the following equation:

$$E \% \text{ wt.} = \frac{100 * E \% \text{ mol} * MW_E}{E \% \text{ mol} * MW_E + P \% \text{ mol} * MW_P}$$

where P % mol is the molar percentage of propylene content while $MW_E$ and $MW_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP mm$T_{\beta\beta}$ (28.90-29.65 ppm) and the whole $T_{\beta\beta}$ (29.80-28.37 ppm).

Ethylene C2 content of component b2 was determined by measuring the C2 content on component B) and then using the formula C2tot=Xb1C2b1+Xb2C2b2 wherein Xb1 and Xb2 are the amounts of components b1 and b2 in the composition.

Elongation at yield: measured according to ISO 527.

Elongation at break: measured according To ISO 527

Stress at break: measured according to ISO 527.

Impact test: ISO 180-1A

Samples for the Mechanical Analysis

Samples were prepared according to ISO 1873-2:2007, except for the flexural modulus. ISO 3167 was used to prepare the samples for flexural modulus.

Flexural Modulus

Determined according to ISO 178.

Preparation of Component A1

Copolymers were prepared by polymerizing propylene and hexene-1 in the presence of a catalyst under continuous conditions in a plant including a polymerization apparatus as described in European Patent No. EP 1 012 195.

The catalyst was sent to a polymerization apparatus having two interconnected cylindrical reactors, riser and downcomer. Fast fluidization conditions were established in the riser by recycling gas from the gas-solid separator. In Examples 1-5, barrier feed was used.

The catalyst involved a catalyst component prepared similarly to Example 5 of European Patent Application No. EP-A-728 769; however, microspheroidal $MgCl_2.1.7C_2H_5OH$ was used instead of $MgCl_2.2.1C_2H_5OH$. Dicyclopentyl dimethoxy silane (DCPMS) was used as an external donor. Triethylaluminum (TEA) was also used.

The polymer particles exiting the reactor were subjected to a steam treatment to remove the reactive monomers and volatile substances and then dried. The main operative conditions and characteristics of the produced polymers are indicated in Table 1.

TABLE 1

| component | | A) |
|---|---|---|
| TEA/solid catalyst component, | g/g | 6 |
| TEA/DCPMS, | g/g | 4 |
| Temperature | °C. | 70 |
| $C_6/(C_3 + C_6)$, mol/mol | Riser | 0.06 |
| $C_6/(C_3 + C_6)$, mol/mol | Downcomer | 0.09 |

$C_3$ propylene;
$C_6$ 1-hexene

Properties of the obtained material has been reported in Table 2:

TABLE 2

| | | Ex 1 |
|---|---|---|
| MFR 5 Kg/230° C. | g/10 min | 1.15 |
| C6-NMR | wt % | 3.3 |
| xylene soluble 25° C. | wt % | 3.4 |
| Polydispersity index | nr | 5.2 |

Component A2 Comparative
Component A2 was a propylene ethylene 1-hexene terpolymer whose features are reported in Table 3.

TABLE 3

| ethylene | wt % | 1.8 |
|---|---|---|
| 1-hexene | wt % | 2.7 |
| MFR 5 Kg/230° C. | g/10 min | 1.2 |
| X.S. | % | 7,7 |
| MEF | MPa | 850 |
| IZOD-20° C. | kJ/m2 | 4,4 |
| Tm | °C. | 136,1 |

Component B)
Component B) was a heterophasic copolymer obtained by sequential gas phase polymerization. The features of the copolymer are reported in Table 4.

TABLE 4

| Component | | B |
|---|---|---|
| Component b1 | | |
| Split | % wt | 32 |
| C2 | % wt | 3.2 |
| Xylene solubles at 25° C. | % wt | <6.5 |
| Component b2 | | |
| Split | % wt | 68 |
| C2 | % wt | 27.0 |
| intrinsic viscosity of the xylene soluble fraction at 25° C. | wt % | 3.2 |

*C2 = ethylene derived units

Components A and B were blended together. The results of the blended composition are reported in Table 5.

TABLE 5

| blend | | Composition 1 | Comparative Blend 2 |
|---|---|---|---|
| Component B | | | |
| Split* | wt % | 4 | 4 |
| MFR | g/10 min | 1.2 | 1.25 |

TABLE 5-continued

| blend | | Composition 1 | Comparative Blend 2 |
|---|---|---|---|
| xylene solubles 25° C. | % | 9.5 | 6.3 |
| flexural modulus | MPa | 1140 | 820 |
| Melting point | °C. | 145.1 | 136.1 |
| IZOD-20° C. | kJ/m² | 3.5 | 3.7 |

*The remaining amount being component A

Pipes were prepared from Composition 1 and Comparative Blend 2. The pipes were tested based on European Standard EN ISO1167 Thermoplastics pipes, fittings and assemblies for the conveyance of fluids—Determination of the resistance to internal Pressure. The results are reported in Table 6.

TABLE 6

| 20° C. | Hoop Stress MPa | Time h | Hoop Stress MPa | Time h |
|---|---|---|---|---|
| C1 | 16.46 | 60 | 14.67 | 1270 |
| 1 | 15.99 | 5087 | 14.68 | 5568 (on test) |
| 95° C. | HoopStress MPa | Time h | | |
| C1 | 4.97 | 6.0 | | |
| 1 | 5.0 | 5568 on test | | |
| 110° C. | Hoop Stress MPa | Time h | | |
| C1 | 4.02 | 0.1 | | |
| 1 | 3.92 | 5571 on test | | |

What is claimed is:

1. A polyolefin composition comprising:
  A) from 85.0 wt % to 99.5 wt % of a propylene 1-hexene copolymer, based upon the weight of the polyolefin composition, wherein:
    (i) the content of 1-hexene derived units ranges from 0.6 wt % to 6.0%, based upon the weight of the propylene 1-hexene copolymer;
    ii) the melt flow rate (MFR) (ISO 1133 230° C., 5 kg) ranges from 0.6 to 5.0 g/10 min;
    iii) the xylene soluble content measured at 25° C. lower than 10 wt %, based upon the weight of the propylene 1-hexene copolymer; and
  B) from 0.5 wt % to 15.0 wt % of a propylene, ethylene copolymer composition, based upon the weight of the polyolefin composition, comprising:
    b1) from 12 wt % to 52 wt %, based upon the weight of the propylene, ethylene copolymer composition, of a propylene homopolymer or a propylene/ethylene copolymer having a content of ethylene derived units ranging from 0.1 wt % to 4.5 wt %, based upon the weight of the propylene/ethylene copolymer; and having a xylene soluble content measured at 25° C. lower than 10 wt %, based upon the weight of the propylene homopolymer or the propylene/ethylene copolymer; and
    b2) from 48 wt % to 88 wt %, based upon the weight of the propylene, ethylene copolymer composition, of a propylene ethylene copolymer having a content of ethylene derived units ranging from 15.0 wt % to 42.0 wt %, based upon the weight of the propylene ethylene copolymer;

wherein the polyolefin composition has a melt flow rate (230° C./5 kg. ISO 1133) ranging from 0.2 g/10 min to 4.0 g/10 min; the sum A+B being 100; and the sum b1+b2 being 100; and the copolymers having only two type of monomers.

2. The polyolefin composition according to claim 1 wherein the content of 1-hexene derived units in component A) ranges from 1.0 wt % to 4.5 wt %, based upon the weight of the propylene 1-hexene copolymer.

3. The polyolefin composition according to claim 1 wherein the content of 1-hexene derived units in component A) ranges from 2.5 wt % to 3.9 wt %, based upon the weight of the propylene 1-hexene copolymer.

4. The polyolefin composition according to claim 1 wherein the content of 1-hexene derived units in component A) ranges from 2.8 wt % to 3.7 wt %, based upon the weight of the propylene 1-hexene copolymer.

5. The polyolefin composition according to claim 1 wherein component b2) is a propylene ethylene copolymer having an content of ethylene derived units ranging from 18 wt % to 38 wt %, based upon the weight of the propylene ethylene copolymer, and an intrinsic viscosity of the xylene soluble fraction at 25° C. ranging from 2.0 dl/g to 5.0 dl/g.

6. The polyolefin composition according to claim 1 wherein the melt flow rate (MFR) (ISO 1133 230° C., 5 kg) of component A) ranges from 0.9 to 2.5 g/10 min.

7. The polyolefin composition according to claim 1 wherein in component A) the melting temperature (DSC) ranges from 155° C. to 130° C. and the melt flow rate (MFR) (ISO 1133 230° C., 5 kg) of component A) ranges from 0.9 to 2.5 g/10 min.

8. The polyolefin composition according to claim 1 having a melt flow rate (230° C./5 kg. ISO 1133) ranging from 0.4 g/10 min to 3.0 g/10 min.

9. An article comprising a polyolefin composition according to claim 1, wherein the article is a pipe system or a pipe sheet.

10. The article of claim 9, wherein the pipe system or pipe sheet has a multilayer structure comprising more than one layer, wherein at least one layer comprises the polyolefin composition.

* * * * *

UNITED STATES PATENT AND TRADEMARK OFFICE
CERTIFICATE OF CORRECTION

PATENT NO. : 10,501,616 B2
APPLICATION NO. : 16/338904
DATED : December 10, 2019
INVENTOR(S) : Galvan et al.

It is certified that error appears in the above-identified patent and that said Letters Patent is hereby corrected as shown below:

In the Specification

Column 1, Line 3, after "PROPYLENE-BASED COMPOSITION FOR PIPES" insert -- This application is the U.S. National Phase of PCT International Application PCT/EP2017/074120, filed September 22, 2017, claiming benefit of priority to European Patent Application No. 16192533.4, filed October 6, 2016, the contents of which are incorporated herein by reference in its entirety. --

Column 3, Line 23, delete "bioxide" and insert -- dioxide --, therefore

Column 3, Line 56, delete "aluminium" and insert -- aluminum --, therefore

Column 5, Line 26, delete "SKOCH$_3$)$_2$" and insert -- SiOCH$_3$)$_2$ --, therefore Column 10, Line 16, delete "Pressure." and insert -- pressure. --, therefore Signed and Sealed this
Twenty-eighth Day of June, 2022

Katherine Kelly Vidal
*Director of the United States Patent and Trademark Office*